(12) United States Patent
Bock

(10) Patent No.: US 6,173,998 B1  
(45) Date of Patent: Jan. 16, 2001

(54) PLUG-IN COUPLING FOR CONNECTING TWO FLUID CONDUITS

(75) Inventor: Gerhard Bock, Grosskrotzenburg (DE)

(73) Assignee: Rasmussen GmbH, Frankfurt (DE)

( * ) Notice: Under 35 U.S.C. 154(b), the term of this patent shall be extended for 0 days.

(21) Appl. No.: 09/356,775

(22) Filed: Jul. 16, 1999

(30) Foreign Application Priority Data

Jul. 16, 1998 (DE) ............................................. 198 31 897

(51) Int. Cl.$^7$ ..................................................... F16L 39/00
(52) U.S. Cl. ........................ 285/319; 285/423; 285/906; 285/921
(58) Field of Search ................................. 285/319, 921, 285/423, 38, 320, 315, 308, 906

(56) References Cited

U.S. PATENT DOCUMENTS

| | | | |
|---|---|---|---|
| 4,573,716 | * | 3/1986 | Guest ..................................... 285/45 |
| 4,895,396 | * | 1/1990 | Washizu ................................ 285/319 |
| 5,112,086 | * | 5/1992 | Gruber et al. ....................... 285/319 |
| 5,163,720 | * | 11/1992 | Abe ....................................... 285/319 |
| 5,167,431 | * | 12/1992 | Maifredi .............................. 285/319 |
| 5,284,369 | * | 2/1994 | Kitamura ............................. 285/319 |
| 5,320,390 | * | 6/1994 | Kodama ............................... 285/319 |
| 5,992,895 | * | 11/1999 | Steinkamp ........................... 285/319 |

* cited by examiner

*Primary Examiner*—Dave W. Arola  
(74) *Attorney, Agent, or Firm*—Darby & Darby

(57) ABSTRACT

A plug-in coupling connects two fluid conduits, one of which has a retaining rib. The plug-in coupling includes a sleeve having radial openings. The coupling also includes an arresting device displaceable within the sleeve. The arresting device has retaining arms. A free end of each arm is hook-shaped for engaging behind the retaining rib. Each of the free ends has an outer inclined face. When the sleeve and arresting device move apart, the inclined face presses against a front edge of the opening that receives the hook. When the arresting device and fluid conduit are pulled apart, an inner inclined face of the hook presses against the retaining rib. In an unlocking position, the outer inclined faces of the hooks are sufficiently spaced from the front edge of the respective opening so that the retaining arms may spread radially apart to permit decoupling. The arresting device also has resilient unlocking arms. An outer part of each one of the unlocking arms projects through one of the openings. To simplify decoupling, axial displacement of the arresting device from the locking position into the unlocking position is effected by radially pressing together the outer parts of the unlocking arms.

5 Claims, 4 Drawing Sheets

PLUG-IN COUPLING FOR CONNECTING TWO FLUID CONDUITS

BACKGROUND OF THE INVENTION

1. Field of the Invention

The present invention relates to a plug-in coupling for connecting two fluid conduits.

More specifically, the present invention relates to a plug-in coupling for connecting a first fluid conduit to a second fluid conduit, where the first fluid conduit has at least one retaining rib. The plug-in coupling includes a sleeve, which has radial openings. A cylindrical arresting device is axially guided for displacement within the sleeve. The arresting device has axially extending and elastically flexible retaining arms with a hook formed at the free end of the arms for engaging behind the retaining rib of the first fluid conduit when the first fluid conduit is axially introduced into the arresting device. The arms have at their free ends a radially outwardly inclined face, which, when the sleeve and the arresting device are moved axially apart into a locking position, presses against a front edge of one of the radial openings in the sleeve. Thus, the hook more firmly engages with the retaining rib when the arresting device and sleeve move axially away from each other. The arms also have at their free ends a radially inwardly facing inclined face that contacts the retaining rib when the arresting device and sleeve move axially away from each other. In an unlocking position, the arresting device is axially retracted into the sleeve such that the radially outer inclined face is sufficiently spaced from the front edge of the respective one of the radial openings in the sleeve to permit the retaining arms to spread radially apart due to the withdrawal movement of the retaining rib of the first fluid conduit. The arresting device has an unlocking arm disposed between each of the retaining arms. The unlocking arm has a radial outer part that projects radially outwardly, in an axially displaceable manner, through one of the radial openings in the sleeve. At least one sealing ring is disposed between an inner shoulder of the sleeve and the arresting device.

2. Discussion of the Related Art

A plug-in coupling is disclosed by German Reference DE 44 13 346 C1. The sleeve and the arresting or snapping device in the German '346 reference have to be moved axially relatively to one another by hand until the rear contact face of the unlocking arms lies against the rear edge of the respective hole through which the radially outer part of the respective unlocking arm projects outwardly. Without a more detailed explanation, the manner in which the unlocking arms have to be actuated to be moved into this unlocking position is not clear. Therefore, those unfamiliar with these unlocking arms, when attempting to release the coupling (e.g., for the purpose of repairing the device, or devices, connected to the fluid conduits), often only try to press the radially outwardly projecting parts of the unlocking arms radially inwardly, in a futile attempt to decouple the connection.

SUMMARY OF THE INVENTION

Accordingly, it is an object of the present invention to provide a plug-in coupling that easily permits an intentional decoupling of the connection.

According to a preferred embodiment of the present invention, this and other objects are achieved by using an arresting device that has unlocking arms. The unlocking arms have radially outer parts that a user will intuitively try to press together to decouple the connection. Because of engaging inclined faces between the unlocking arms and the sleeve, axial displacement of the arresting device into an unlocking position is effected by this pressing action.

Thus, in accordance with this solution, only the outer parts of the unlocking arms need to be pressed radially inwardly to achieve decoupling. After the unlocking arms are pressed inwardly, the user simply axially pulls apart the first fluid conduit, which has the retaining rib, from the plug-in coupling. This manner of decoupling the plug-in coupling is intuitive to most users, even those unfamiliar with the structural features of the present invention unlocking arms.

The unlocking arms preferably extend axially and are elastically flexible. Like the retaining arms, the unlocking arms have free ends that are hook-shaped. The unlocking arms, therefore, additionally serve as retaining arms. Thus, the unlocking arms increase the contact surface with the retaining rib via their hook-shaped free ends, thereby resulting in a firmer hold on the connection to prevent accidental or unintentional decoupling.

The unlocking arms each project radially outwardly through a radial opening in the sleeve. The unlocking arms also have a spring arm that extends axially away from the insertion opening of the sleeve. The spring arm has a first projection that projects radially inwardly. In an unlocking position, the arresting device is moved axially away from the insertion opening in the sleeve. To move the arresting device from the locking position to the unlocking position (i.e., by moving the retaining and unlocking arms back towards the rear edge of the radial openings), the spring arms are pressed radially inwardly causing first projection to engage a rear inclined face of a second projection on the outside of the sleeve. The inclined face is remote from the insertion opening of the sleeve.

To release or decouple the first fluid conduit from the arresting device, the spring arms are pressed against the sleeve to move the arresting device from the locking position to the unlocking position and so that the arresting device is fixed with respect to the sleeve. The arresting device is now in the unlocking position and is fixed with respect to the sleeve. The first fluid conduit can be pulled axially apart from the plug-in coupling, thereby causing the retaining arms to spread apart radially to separate the two fluid conduits.

In accordance with a further advantageous embodiment of the present invention, a radial outer part of each unlocking arm extends axially and has at the front end thereof a radially inner inclined face. In the locking position, the radially inner inclined face abuts against a radially outer inclined face of the sleeve. The radially outer inclined face is adjacent to a front edge of the opening that receives the outer part of the unlocking arm.

In this solution, the outer part of the unlocking arms only needs to be pressed radially inwardly to axially displace the retaining arms of the arresting device relative to the sleeve, into the unlocking position. If a radially inwardly directed pressure is applied by hand to the radial outer part of the unlocking arms, the radially inner inclined face of the unlocking arms slides along the radially outer inclined face of the sleeve, thereby causing the axial movement of the arresting device from the locking position into the unlocking position.

BRIEF DESCRIPTION OF THE DRAWING FIGURES

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PREFERRED EMBODIMENT(S)

Figure 1:
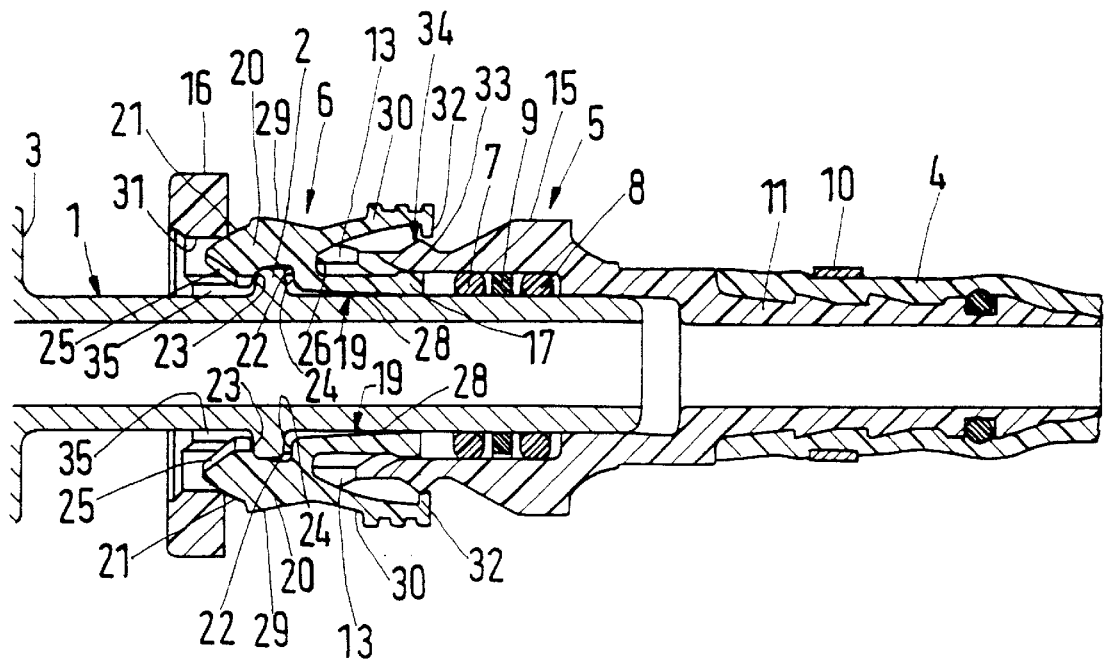
FIG. 1 is an axial cross-sectional view of a plug-in coupling in accordance with the present invention, in a firmly connected or locking position, with a first fluid conduit, in the form of a pipe socket having a retaining rib, inserted into the plug-in coupling, and with a second fluid conduit placed firmly onto the opposite end of the plug-in coupling.

Referring now to FIGS. 1–7, a plug-in coupling, which is used to connect a first fluid conduit 1 to a second fluid conduit 4, is illustrated. Conduit 1 is typically made of a plastic or metal material and is in the form of a connecting sleeve or pipe socket and has an outer peripheral retaining rib 2. Conduit 1 is typically formed, for example, on the housing 3 of a motor vehicle radiator. Fluid conduit 4 is typically made of a plastic material and is in the form of a hose.

The plug-in coupling includes a cylindrical sleeve 5, an arresting device 6, two sealing rings 7 and 8 and a securing ring 9 disposed between the two sealing rings 7, 8. Additionally, a clampable hose clip 10 may be placed around second fluid conduit 4 to firmly clamp second conduit 4 to a ribbed end section 11 of sleeve 5. An optional O-ring (unnumbered) may also be disposed between ribbed end section 10 and second fluid conduit 4.

The opposite axial end portion of sleeve 5 has four radial openings 12 and 13 distributed uniformly over its periphery. Openings 12, 13 have a rectangular shape and extend in the longitudinal or axial direction of sleeve 5. The internal diameter of the axial end portion of sleeve 5 that has openings 12, 13 is greater than the internal diameter of the adjacent section of sleeve 5 that receives the rings 7, 8 and 9. The internal diameter of the portion of sleeve 5 adjacent to end section 11 is approximately equal to the external diameter of the first fluid conduit 1, and the internal diameter of end section 11 of sleeve 5 is approximately equal to the internal diameter of first fluid conduit 1. As shown more clearly in FIG. 9, on either circumferential side of each opening 13, the outer surface of sleeve 5 has a flattened region 14 that extends transversely with respect to the longitudinal axis of sleeve 5. On either axial side of openings 12, 13, sleeve 5 has cylindrical surfaces 15 and 16, which are of different diameter. Cylindrical surface 16, which is adjacent to the end of sleeve 5, is greater in diameter than cylindrical surface 15.

Figure 3:
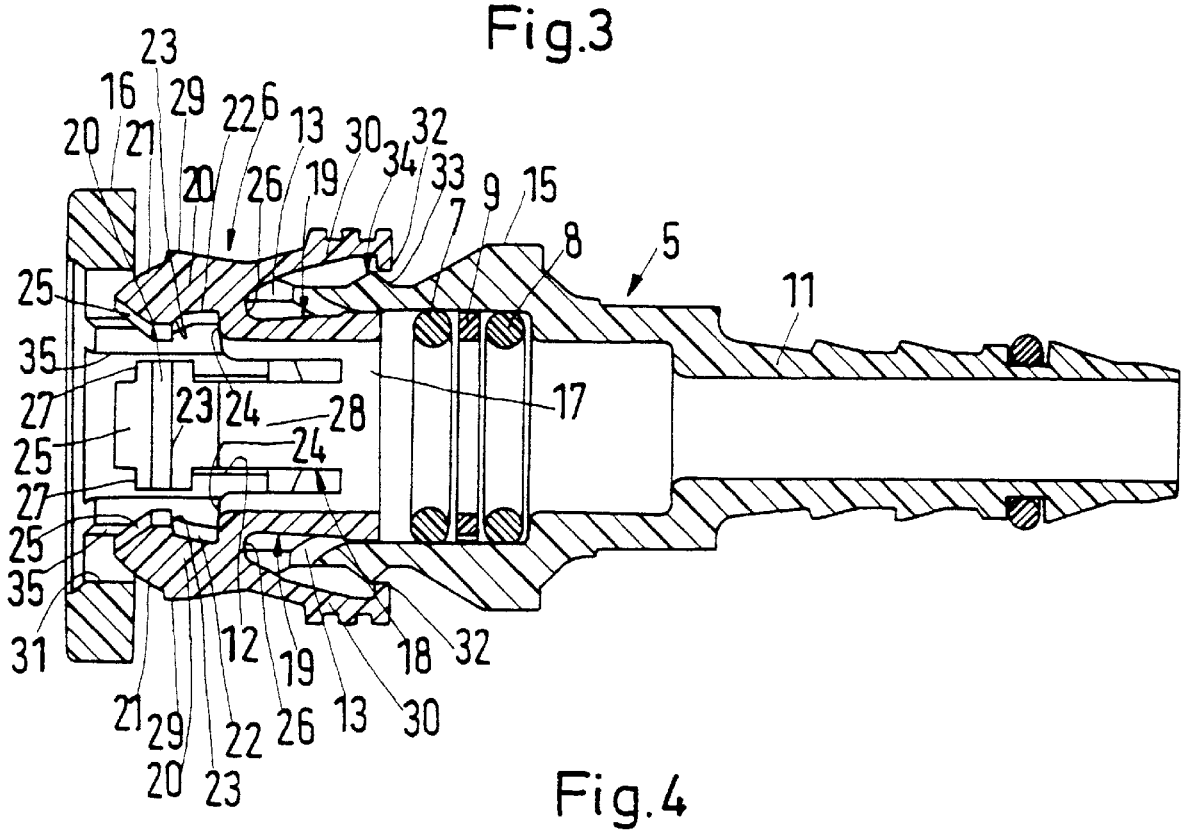
FIG. 3 is an axial cross-sectional view of the plug-in coupling of FIG. 2 (i.e., in the unlocking position), and without the first fluid conduit shown in FIG. 2.
Figure 4:
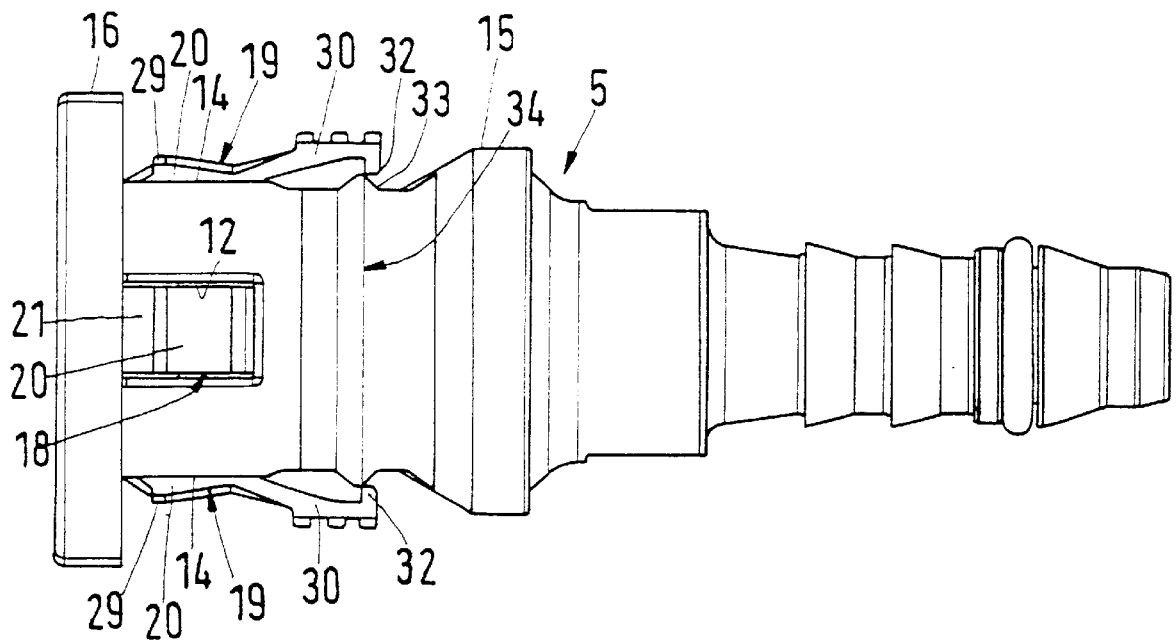
FIG. 4 is a side view of the plug-in coupling shown in FIG. 3.
Figure 5:
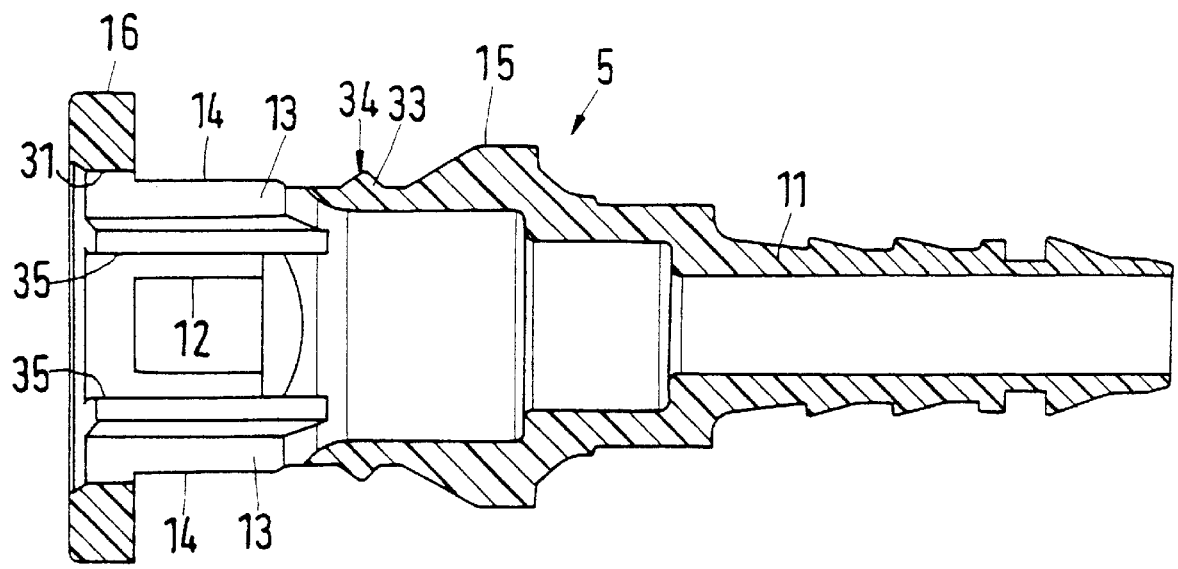
FIG. 5 is an axial cross-sectional view of a sleeve of the plug-in coupling shown in FIGS. 1–4.
Figure 6:
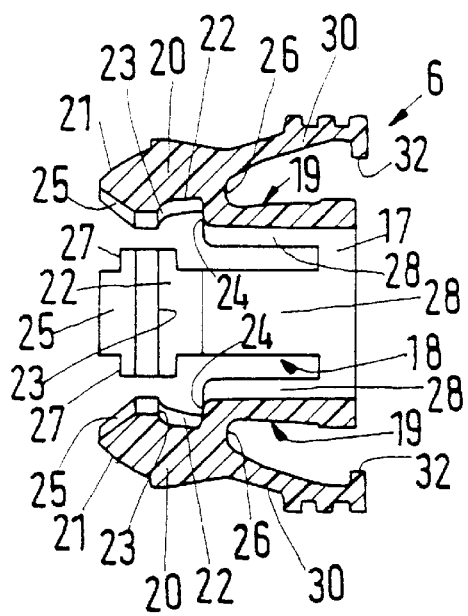
FIG. 6 is an axial cross-sectional view of an arresting device of the plug-in coupling shown in FIGS. 1–4.
Figure 7:
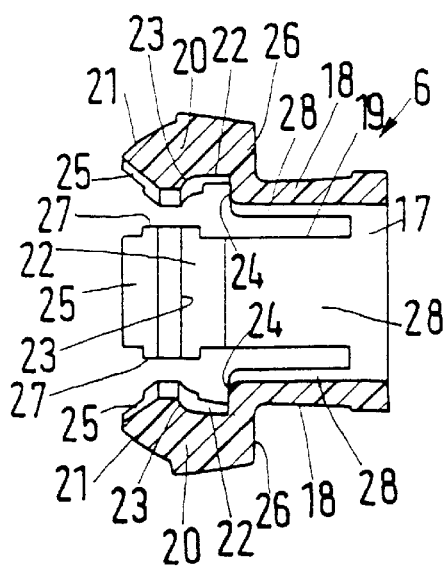
FIG. 7 is an axial cross-sectional view of the arresting device of FIG. 6, which is rotated through 90° relative to the axial section of FIG. 6.

Referring now to FIGS. 3, 6 and 7, the arresting device 6 includes a closed ring 17 having two elastically flexible retaining arms 18 and two elastically flexible unlocking arms 19 formed on ring 17. The unlocking arms 19 and the retaining arms 18 each have a hook 20 disposed at their free end for engaging behind retaining rib 2 when first fluid conduit 1 is inserted axially into arresting device 6 (See FIGS. 6 and 7). A radially outwardly facing inclined face 21 is disposed at the free ends of hooks 20. A recess 22 is disposed on the radially inwardly facing side of hook 20. Recess 22 is delimited on the axially outer side by a radially inward facing convex inclined face 23. Recess 22 is delimited on the opposite axially inner side thereof by a radial surface 24. Recess 22 is inward facing so that it receives retaining rib 2 in a clearance-free manner independent of the tolerance of the width of the axial retaining rib 2. In addition, each hook 20 has a radially inwardly facing inclined face 25 at its free end, a radially extending contact surface 26 remote from the axially front end for positioning on a rear edge of opening 12 or 13 to restrict the axial push-in movement of arresting device 6 in the rearward direction (i.e., away from insertion opening 31 of sleeve 5). A lateral projection 27 is disposed on each hook 20 close to the front end thereof for abutting the inside of sleeve 5. The radial inner surfaces 28 of each retaining arm 18 and the radial inner surface 28 of each unlocking arm 19 has a partial cylindrical shape, whose diameter corresponds to the external diameter of the first fluid conduit 1 in the adjacent region.

The unlocking arms 19 are disposed between the retaining arms 18. The retaining arms 18 and the unlocking arms 19 are distributed at equal angular spacings over the periphery of the substantially cylindrical arresting device 6. Thus, the unlocking arms 19 are located diametrically opposite one another with respect to the longitudinal axis of the sleeve 5 and the arresting device 6. Likewise, the retaining arms 18 are located diametrically opposite one another with respect to the longitudinal axis of the sleeve and the arresting device. The unlocking arms 19, like the retaining arms 18, have hooks 20, which have the same shape as the hooks 20 of the retaining arms 18. But, whereas the radial outer parts of the hooks 20 of the retaining arms 18 project into and are axially displaceable in openings 12, the radial outer parts 29 of the unlocking arms 19 project through openings 13 and extend radially outwardly across the flattened regions 14. A radial outer portion 29 of the unlocking arms' hooks 20 is also displaceable within opening 13. The unlocking arms 19 are elastically flexible. Each unlocking arm 19 also has a spring arm 30, which extends radially outside of sleeve 5 and rearwardly in the axial direction with respect to the insertion opening 31 of sleeve 5. Spring arms 30 are profiled radially on their outer peripheral surface by transversely extending ribs to enable the spring arms 30 to be held securely by the thumb and index finger of one hand. Spring arms 30 project further radially than cylindrical surface 15. But the outer surface of radially outer part 29 of the unlocking arms 19 is disposed radially inside of cylindrical surface 16 (See FIGS. 1 and 2).

Each of the spring arms 30 has a radially inwardly oriented first projection 32. When the retaining arms 18 and unlocking arms 19 are disposed in the locking position, arms 18, 19 are displaced axially adjacent to the front edge of openings 12, 13, as shown in FIG. 1. In the locking position, first projection 32 is disposed above an inclined face 33 on the outer peripheral surface of sleeve 5. Inclined face 33 is preferably the inclined rear flank of a second projection 34 on the outer peripheral surface of sleeve 5.

Axially extending ribs 35 are disposed on the inside peripheral surface of sleeve 5. Ribs 35 abut a relatively large portion of the surface area of retaining rib 2 of first fluid conduit 1 when conduit 1 is inserted into the arresting device 6 and sleeve 5 through the insertion opening 31 in sleeve 5. Ribs 35 largely prevent lateral deflection of first fluid conduit 1 when it is inserted into the plug-in coupling because the first fluid conduit 1 is supported in a non-yielding manner by its retaining rib 2 abutting against the axial ribs 35, as soon as the retaining rib enters the insertion opening 31. Therefore, the load on the sealing rings 7, 8 is considerably reduced, resulting in the sealing rings 7, 8 having a relatively long service life. The sealing ability of the plug-in coupling of the present invention is, therefore, maintained even in the presence of high transverse forces. The sealing ability is also maintained at low temperatures of up to about −40° C. Axial ribs 35 also provide improved guidance when first fluid conduit 1 is being introduced into the plug-in coupling. For example, during insertion, the first fluid conduit 1 is not able to strike against the end face of one of the retaining arms 18 or unlocking arms 19, as might happen if the first conduit is inserted in an inclined, non-coaxial, position. If the first fluid conduit 1 were to strike against one of the end faces of one of the arms, the user might be given the false impression that the coupling operation has been completed even though no locking has, in fact, taken place. Additionally, because the plug-in coupling includes axial ribs 35, sleeve 5 is further reinforced. Further, the plug-in coupling's maximum disconnecting force is increased, so that the connection can withstand greater axial loads. Additionally, because retaining rib 2 abuts the axial ribs 35 over a relatively large contact surface, a relatively smaller transition resistance occurs, thereby resulting in electrostatic charges being effectively eliminated.

To connect fluid conduits 1 and 4, the plug-in coupling is connected to the second fluid conduit 4. The plug-in coupling is then connected to the first fluid conduit 1, as shown in FIG. 1. As first fluid conduit 1 is inserted into the insertion opening 31, the retaining rib 2 presses against the inclined faces 25 of the hooks 20. Continued insertion of first fluid conduit 1 causes rib 2 to engage inclined faces 25, thereby causing retaining arms 18 and unlocking arms 19 to spread radially outwardly. Continued insertion of first fluid conduit 1 causes rib 2 to displace the entire arresting device 6 so that it moves axially into sleeve 5 far enough so that the contact surfaces 26 of the retaining arms 18 and unlocking arms 19 abut the rear edge of openings 12 and 13, respectively. Continued insertion of first fluid conduit 1 causes the retaining arms 18 and unlocking arms 19 to finally engage over the retaining rib 2 so that rib 2 is received in recess 22, at which point the arms 18, 19 spring back (i.e., move radially inwardly) into the position shown in FIG. 1 (but the arresting device 6 is moved to the unlocking position that is to the right from the position illustrated in FIG. 1) due to the stressing which has been imparted to the arms by being spread radially outwardly.

If a high pressure develops in fluid conduits 1 and 4 when coupled, the axial components of the pressure cause sleeve 5 and first fluid conduit 1 to move axially apart to the locking position shown in FIG. 1. However, during this axial movement, inclined faces 21 of the retaining arms 18 and of the unlocking arms 19 abut the inner front edge of openings 12 and 13, respectively, thereby causing the hooks 20 to be pressed even more firmly against retaining rib 2. Thus, a forceful decoupling of the connection is prevented, even in the event of an excessive axial load being placed on the connection.

Figure 2:
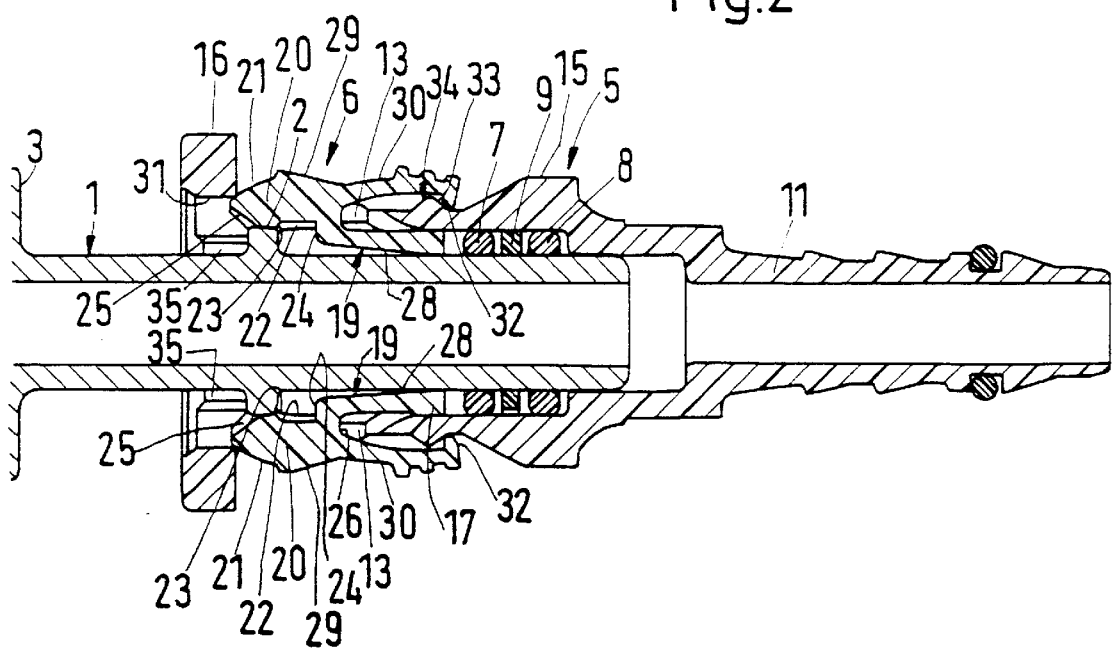
FIG. 2 is the same axial cross-sectional view of the plug-in coupling of FIG. 1, but in an unlocking position in which the fluid conduits can be separated.

To separate or decouple the connection between fluid conduits 1 and 4, spring arms 30 of unlocking arms 19 may be grasped, for example, by the thumb and index finger of one hand. The user will then press the spring arms radially inwardly using the thumb and index finger. Continued pressing in of spring arms 30 causes projections 32 to slide along inclined face 33 of projection 34, thereby causing a radial and axial movement component in the arresting device 6. The axial movement component produces a relative movement between sleeve 5 and arresting device 6 into the unlocking position of FIG. 2. In the unlocking position, retaining arms 18 and unlocking arms 19 can be spread apart radially by the retaining rib 2, when first fluid conduit 1 is pulled axially apart from the plug-in coupling, as shown in FIG. 2. Further axial pulling apart of first fluid conduit 1 from the plug-in coupling enables fluid conduits 1 and 4 to be separated.

In the unlocking position of FIG. 2, projections 32 of arresting device 6 engages behind projection 34 of sleeve 5 to more securely hold the arresting device 6 during decoupling. In other words, the engaging of the projections 32, 34 ensures that sleeve 5 and arresting device 6 are not axially pulled apart during decoupling.

The manner in which the plug-in coupling in accordance with the present invention operates, especially with respect to decoupling fluid conduits 1 and 4, is, therefore, relatively intuitive even to an unskilled user. Thus, to decouple the fluid conduits requires no detailed explanations. The plug-in coupling according to the present invention is, as a whole, easy to connect as well as to separate fluid conduits 1 and 4.

Figure 8:
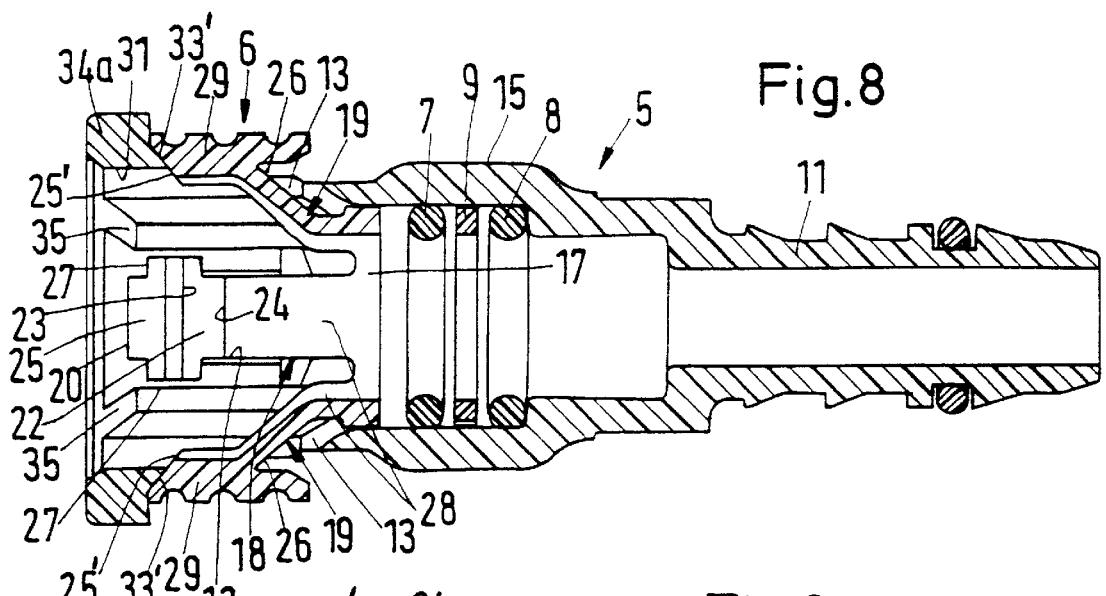
FIG. 8 is an axial cross-sectional view of a second embodiment of a plug-in coupling in accordance with the present invention, in the unlocking position.
Figure 9:
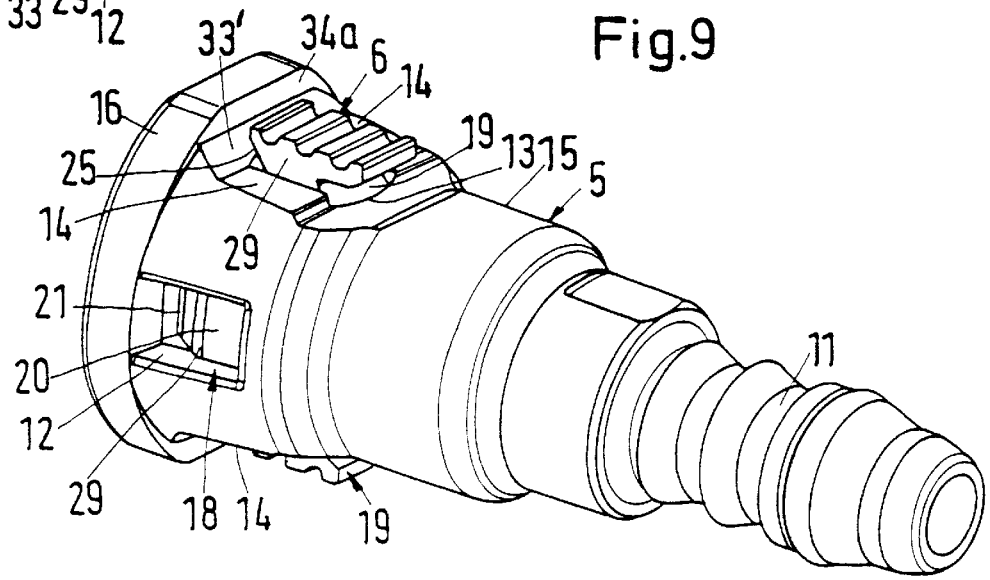
FIG. 9 is a perspective view of the plug-in coupling of FIG. 8.
Figure 10:
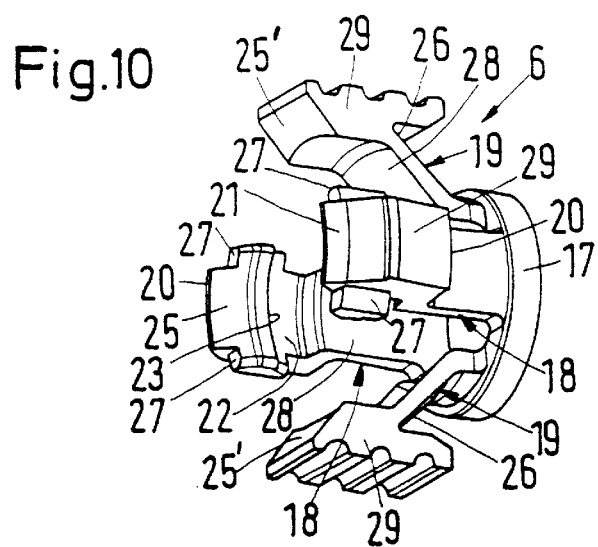
FIG. 10 is a perspective view of the arresting device of the plug-in coupling of FIGS. 8 and 9.

Referring now to FIGS. 8–10, another embodiment of the plug-in coupling according to the present invention is illustrated. Because this embodiment is essentially identical to the embodiment illustrated in FIGS. 1–7, the same reference numerals will be used to identify like parts from the FIGS. 1–7 embodiment for parts which are the same or which operate in a similar manner. This second embodiment differs from the first embodiment essentially in that the unlocking arms 19 do not have a hook 20 and they do not have a radially inwardly projecting projection like projection 32 of the first embodiment. Radially outer part 29 of unlocking arm 19 has a radially inner inclined face 25' disposed at the free front end thereof. Radially outer part 29 projects from openings 13. Cylindrical surface 16 of sleeve 5 has an inclined rear flank 33' formed on the peripheral projection 34a. Radially inner inclined face 25' and inclined rear flank 33' serve the same function as first projection 32 and the inclined face 33 of second projection 34 of the first embodiment.

The fluid conduits 1 and 4 are connected in the same manner as in the first embodiment, which is also in the same manner as the plug-in coupling according to German Reference DE 44 13 346 C1, the disclosure of which is hereby incorporated by references.

As in the first embodiment, to separate fluid conduits 1 and 4, sleeve 5 and arresting device 6 must first be axially displaced relative to each other into the unlocking position in which inclined faces 21 of retaining arms 18 are no longer abutting against the radially outer edges of openings 12. Thereafter, axially pulling apart first fluid conduit 1 from the plug-in coupling causes the retaining arms 18 to be spread radially outwardly by retaining rib 2.

To move sleeve 5 axially with respect to arresting device 6, only radially outer parts 29 of the unlocking arms 19 needs to be pressed radially inwardly. Radially outer parts 29 may, for example, be pressed radially inwardly by the thumb and index finger of one hand, which causes inclined faces 25' to slide along inclined faces 33', which movement creates a simultaneous axial displacement of arresting device 6 relative to sleeve 5 into the unlocking position. The first fluid conduit 1 and the plug-in coupling, which is connected to the second fluid conduit 4, can then be pulled apart axially, which movement causes the retaining arms 18 to be spread radially outwardly due to the withdrawal movement of the retaining rib 2. Thus, further axial pulling apart of first fluid conduit 1 from the plug-in coupling causes fluid conduits 1 and 4 to be separated.

The manner in which the plug-in coupling in accordance with this second embodiment of the present invention is operated to connect and/or decouple the fluid conduits is also relatively intuitive, even to an unskilled user.

Having described the presently preferred exemplary embodiment of a plug-in coupling for connecting two fluid conduits in accordance with the present invention, it is believed that other modifications, variations and changes will be suggested to those skilled in the art in view of the teachings set forth herein. For example, in the first embodiment, sleeve 5 can be provided with an annular groove having an approximately V-shaped cross-section instead of projection 34. One inclined flank of the V-shaped groove would correspond to inclined face 33 into which projection 32 would be able to engage when spring arms 30 are pressed together to axially displace arresting device 6 relative to sleeve 5, thereby causing projection 32 to slide along the inclined flank. Conversely, it is also possible to form a groove having an approximately V-shaped cross-section in the radially inner side of spring arms 30. The V-shaped groove would extend transversely with respect to spring arms 30. When spring arms 30 are pressed together, one flank of the V-shaped groove would engage with inclined face 33 of projection 34 to axially displace arresting device 6 relative to sleeve 5. It is, therefore, to be understood that all such modifications, variations, and changes are believed to fall within the scope of the present invention as defined by the appended claims.

What is claimed is:

1. A plug-in coupling for connecting a first fluid conduit to a second fluid conduit, wherein said first fluid conduit has at least one retaining rib disposed on an outer peripheral surface thereof, said plug-in coupling comprising:

a sleeve having a plurality of radial openings, each of said radial openings having a front edge, said sleeve having an inner shoulder formed on an inner peripheral surface thereof;

a cylindrical arresting device being received and axially displaceable within said sleeve, said arresting device being axially displaceable between a locking position and an unlocking position, said arresting device having at least two axially extending, elastically flexible retaining arms depending from said arresting device, a free end of each of said retaining arms being hook-shaped for selectively engaging said retaining rib when said first fluid conduit is inserted into said arresting device, each of said free ends having a radially outwardly facing inclined face that, in said locking position, abuts against said front edge of one of said radial openings in said sleeve when said sleeve and said arresting device are axially displaced away from each other thereby increasing the engagement force applied by said hook-shaped free end to said retaining rib, each of said free ends having a radially inwardly facing inclined face that is disposed adjacent to said retaining rib when said first fluid conduit is inserted in said arresting device; said arresting device having at least two unlocking arms depending therefrom, one of said unlocking arms being disposed between two of said retaining arms, each of said unlocking arms projecting radially outwardly with a radial outer part through one of said radial openings in said sleeve, each of said unlocking arms being axially displaceable with respect to said sleeve;

at least one sealing ring being disposed between said inner shoulder of said sleeve and said arresting device; and wherein, said arresting device being displaceable from said locking position to said unlocking position by radially inwardly pressing together said radially outer parts of said unlocking arms, in said unlocking position, said arresting device is axially retracted into said sleeve, said radially inner inclined face of said retaining arms abut against said retaining rib and said radially outer inclined faces of said free ends are sufficiently spaced from said front edge of said respective opening in said sleeve so that said retaining arms may spread radially apart to permit decoupling of said first fluid conduit from said plug-in coupling.

2. The plug-in coupling according to claim 1, wherein said unlocking arms extend axially and are elastically flexible, a free end of each of said unlocking arms being hook-shaped for selectively engaging said retaining rib when said first fluid conduit is inserted into said arresting device, each of said free ends having a radially outwardly facing inclined face that, in said locking position, abuts against said front edge of one of said radial openings in said sleeve when said sleeve and said arresting device are axially displaced away from each other thereby increasing the engagement force applied by said hook-shaped free end to said retaining rib, each of said free ends having a radially inwardly facing inclined face that is disposed adjacent to said retaining rib when said first fluid conduit is inserted into said arresting device.

3. The plug-in coupling according to claim 2, wherein said hook-shaped free ends of said unlocking arms each project radially outwardly through one of said radial openings, each of said unlocking arms having a spring arm that extends axially away from an insertion opening of said sleeve, said spring arm having a first projection projecting radially inwardly, in said unlocking position, said first projection engages an inclined face of a second projection disposed on the outside of said sleeve when said spring arms are pressed against said sleeve to permit said first fluid conduit to be decoupled from said arresting device.

4. The plug-in coupling according to claim 3, wherein said spring arm is radially outwardly profiled.

5. The plug-in coupling according to claim 1, wherein said radial outer part of each unlocking arm extends axially and has at the front end thereof a radially inner inclined face, which, in a locking position, abuts against a radially outer inclined face of said sleeve, said radially outer inclined face being adjacent to a front edge of said opening that receives said outer part of said unlocking arm.

* * * * *